United States Patent Office 3,316,181
Patented Apr. 25, 1967

3,316,181
PROCESS FOR BREAKING EMULSIONS OF THE OIL-IN-WATER TYPE
John J. Sackis, Chicago, Ill., assignor to Nalco Chemical Company, Chicago, Ill., a corporation of Delaware
No Drawing. Filed Nov. 23, 1965, Ser. No. 509,431
9 Claims. (Cl. 252—344)

This application is a continuation-in-part of my co-pending application, Ser. No. 248,282, filed December 31, 1962, and now abandoned.

The instant invention relates to a method of resolving or separating emulsions of the oil-in-water type by chemical treatment. More specifically, the present invention is concerned with demulsifying oil-in-water emulsions by treating them with minor dosages of water-soluble cationic copolymers.

Oil-in-water emulsions are the type of emulsions which comprise organic oily materials which are distributed or dispersed as small drops throughout a continuous body of non-oily media. The organic oily materials which are immiscible with water or aqueous or non-oily media, in many instances form stable, difficultly separable emulsions. Often the amount of dispersed oily phase is minor in comparison to the aqueous or non-oily continuous phase, and is resistant to resolution.

The different types of oil-in-water emulsions are legion. They may contain one of the desired products of an industrial process or a by-product which must be recovered to improve the overall economics of the process. An example of an economically important type of emulsion is one in which small proportions of petroleum or petroleum fractions are stably dispersed in water and/or brine non-oily continuous phases. It is essential to resolve this emulsion in order to recover the oily material free of undesirable aqueous phase. Likewise, in the oil refining process itself emulsions are frequently found. For example, difficultly resolvable oil-in-water emulsions may comprise a petroleum distillate occurring as a dispersion in water; an emulsion resulting in the manufacture of butadiene from heavy naphtha by cracking in gas generators, and particularly those emulsions which are found in the wash box waters of gas generators, and emulsions of the oil-in-steam condensate which result from catalytic dehydrogenation of butylene to produce butadiene. Other emulsions of this type include those in which small amounts of lubricating oil are found dispersed in condensed steam from steam engines and steam pumps, waxhexane water emulsions resulting from a dewaxing process in oil refining, butadiene tar-in-water emulsions, styrene-in-water emulsions, synthetic latex-in-water emulsions, those emulsions occurring in cooling water systems of gasoline absorption plants, etc.

Not only are emulsions found in areas of petroleum refining, but are also encountered in metal working industries, steel and aluminum rolling mills, chemical processing, food processing, and the like. Specifically, emulsions of oily matter in water or other non-oily environment are encountered in milk and mayonnaise processing, marine ballast water disposal, and furniture polish formulations. Often steam distillation and other techniques cause the above emulsions from which the valuable oil must be resolved and recovered.

A simple economical method of breaking the above emulsions consists in chemical addition of various reagents which, if properly chosen, cause sharp boundary breaks in the respective phases. However, in order to achieve quick, efficient, and lasting resolution, the chemicals so chosen must have certain characteristics adaptable to the various physico-chemical mechanisms operating in any given emulsion.

It is believed that one of the most basic requirements of a chemical emulsion breaker is the solubility of the chemical in the continuous phase of an emulsion to be treated. That is, for resolution of oil-in-water emulsions or those in which oil droplets are the dispersed phase and an aqueous non-oily media such as water or water compatible materials as alcohols are the continuous phase, it is necessary for best results that the emulsion breaker be soluble in water and/or water compatible materials.

Another requirement of an emulsion breaker in order that it may achieve a wide range of applicability is that it be surface active. The surface activity of the chemical reagent imparts mobility and direction to it so that it will tend to migrate to the interface of the water-in-oil due to its inherent chemical nature. Additional effectiveness is gained because the emulsion breaker is thereby concentrated at the area of the interface.

In many instances the emulsifier must have ionic charge in order to resolve the emulsion. This charge is necessary to reduce or even completely remove the opposite charge frequently existing on the emulsion droplets which causes them to repel one another. The charge on the emulsion droplets is due either to the charge of the stabilizing emulsifier or due to frictional charge obtained when the emulsion is formed.

Another characteristic which an active emulsion breaker must have is the tendency to alter the liquid surface or interfacial tension which is commonly a factor in emulsion breaking. Surface-active agents normally possess this desirable property.

Yet another property which a desirable demulsifier must possess is a type of solubilizing effect. Many emulsions contain suspended droplets surrounded by a skin or a pellicle, which almost appears in some instances to be more or less insoluble at the interface between droplet and suspension medium. This pellicle physically protects the droplet or acts as a protective film preventing coalescing and is resistant even to severe mechanical agitation. The emulsion-breaking chemical should have an effect on this outer layer surrounding the emulsion droplet. Again, such effect is generally shown by surface-active reagents.

Lastly, it has been found that many oil-in-water emulsions can only be effectively broken with clean resolution of discontinuous and continuous phases, by treatment with large molecules such as long chain polymeric materials. These preferably also possess the above outlined characteristics in acting upon the emulsions.

It would therefore be of benefit to the art if a class of compounds could be discovered which possesses all of the above characteristics by virtue of inherent molecular structure, and which also exhibit efficiency in a wide variety of oil-in-water emulsions, as well as being effective even at relatively low dosages.

It therefore becomes an object of the invention to provide a method of resolving oil-in-water emulsions by treating with a specific class of water-soluble, cathonic polymeric materials which when added to the above emulsions gives the desired separation of phases in a rapid and efficient operation.

A specific object of the invention is to provide a process of emulsion breaking by use of water-soluble high molecular weight copolymeric substances which have a wide range of applicability, and are particularly effective in resolving oil-in-water emulsions of petroleum systems.

Other objects will appear hereinafter.

In accordance with the invention a successful method has been discovered for breaking emulsions of the type comprising an oil phase dispersed in a non-oily continuous phase such as water or such hydrophilic liquids as water-miscible alcohols, mixtures of same with water, etc. In this process it has been found that excellent separation of the oil and non-oil phases may be effected by treatment of the emulsion with at least a demulsifying amount of a copolymeric polyacrylamide demulsifier which has a plurality of a wide variety of cationic groupings. After such chemical treatment of the emulsion, the respective phases may be rapidly resolved into distinct layers which are then separated by any number of well-known mechanical means such as merely drawing the heavier non-oily layer away from the lighter oil fraction through gravity separation means.

It has been noted that emulsion resolution of the respective phases may be carried out more efficiently, rapidly, and with resultant increased clarity of the respective phases by lowering the pH of the oil-in non-oily base below a pH of about 8.0 prior to treatment with the emulsifier. Of course, in many instances, the pH range may be already below that enumerated above. In this embodiment, the pH may even be lowered to about 1.0. However, for best results, the pH of the emulsion ranges between 2 and 8 prior to the demulsification step.

The copolymeric chemical demulsifiers of the invention are water-soluble copolymers of acrylamide in combination with some other polymerizable addition comonomer. The respective monomers are intimately mixed with one another and copolymerized by known methods such as bulk, solution, emulsion, suspension, etc., polymerization techniques. Preferably, the final active copolymer will contain from 1 to 99 parts of polyacrylamide, while the cationic constituent will likewise comprise 1-99 parts of the overall copolymer. In each case, the final copolymeric materials are viscous, water-soluble samples of a relatively high molecular weight, at least above about 2,000 and preferably above about 10,000. It has been noted that the residence time or settling time is generally in inverse proportion to the chain length or the degree of molecular weight. Thus, the higher molecular weight samples are generally preferred.

The primary formed copolymeric product may be added to the emulsion in a wide range of dosage treatment. Normally, at least 10 p.p.m. of copolymer based on the weight of the emulsion is necessary. For more efficient results, 100 p.p.m. is preferred, and dosages ranging between 100 p.p.m. and 10,000 p.p.m. may be employed in the demulsification step.

Polymerizable monomers which may be copolymerized with acrylamide in addition type copolymerizations may be chosen from a wide range of available materials. A few of these cationic monomers which have been employed in conjunction with acrylamide as copolymeric emulsion breakers after the respective comonomers have been polymerized by known means to at least a certain minimum degree, may be chosen from among diallylamine, vinyl pyridine, alkylene imines such as ethylenemine, 1-2-propylenimine, 1-2-butylenimine, 2-2-dimethylimine, 2,3-butylenimine, 1,1-dimethyl, 2-n-propylethylenimine, trimethyleneimine, and lower alkyl substituted derivatives thereof; ethylenically unsaturated monomeric ester compounds containing a basic amino group such as dimethylaminoethyl acrylate and methacrylate, 3-dimethyl- or 3-diethylaminopropyl acrylate and methacrylate, 2-dimethylaminoisopropyl acrylate and methacrylate, dimethylaminoethyl ethyl acrylate, diethylaminoethyl ethyl acrylate, 2-dimethylaminoisopropyl ethyl acrylate, and 1-butylaminoethyl methacrylate or acrylate; etc. Of the above, the most preferred class is the amino ester monomer type. Salts and quaternary derivatives of any of the above may also be employed. The salts or quaternaries may be prepared either prior to or subsequent to the copolymerization reaction with acrylamide monomer. Likewise, any combination of two or more cationic monomers may be polymerized with the acrylamide monomer to give terpolymers or even polymers containing more than two different species of cationic monomers in combination with acrylamide. Thus, by the term "copolymer" is meant a water-soluble substantially linear polymeric material containing acrylamide and at least one cationic substituent derived from a polymerizable cationic addition monomer.

Most preferred cationic comonomers which may be copolymerized with acrylamide include diallylamine, dimethylaminoethyl methacrylate, vinyl pyridine and diethylaminoethyl acrylate.

By far the most preferred cationic copolymer of the invention is that formed by reaction of acrylamide and a bis-ethylenically unsaturated compound having the following structural formula:

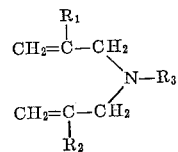

where $R_1$ and $R_2$ are selected from the group consisting of hydrogen and methyl radicals, and $R_3$ is a member of the class consisting of hydrogen and lower alkyl radicals. Preferably, when $R_3$ is a lower alkyl radical it contains less than about 4 carbon atoms. Again, the acrylamide portion of the above copolymeric compositions may contain from 1-99 parts of acrylamide and the cationic constituent may comprise 1-99 parts of diallylic compound. Preferably, the copolymer contains 25-95 parts of acrylamide and 5-75 parts of the allylic monomer. In the most preferred embodiment, the copolymer contains from about 60 to about 90 parts of acrylamide and from about 10 to about 40 parts of the cationic allylic monomer. Representative allylic compounds which may be copolymerized with acrylamide include diallylamine, dimethylallylamine, diallylmethylamine, dimethylethylamine, etc. As already mentioned, for effective results any of the above copolymers must be water-soluble in order to enter into the aqueous or non-oily continuous phase and thoroughly promote demulsification.

In order to prepare the above allylic-acrylamide copolymers it is only necessary to mix the ingredients in the desired proportions and polymerize them by known techniques such as bulk, solution, emulsion, suspension means etc. The catalyst initiator may be any free radical producing agent. However, it has been found that a redox catalyst system comprising a catalyst initiator and reducing agent is employed in conjunction with a metal activator is particularly referred. Using this scheme, high molecular weight water-soluble viscous materials are produced which have excellent activity in promoting resolution of oil and non-oily media such as aqueous solutions and the like. When such a system is employed, the desired molecular weight concomitant with water solubility may be achieved even in the presence of oxygen which normally acts as a retarder in this type of polymerization.

In a preferred embodiment involving a solution polymerization the allylic amine is first reacted with mineral or organic acids such as hydrochloric, sulfuric, phosphoric, nitric, formic, acetic, lactic, etc., to form salts thereof. To the salt, normally formed in an aqueous solution, is then added acrylamide monomer. The scheme of addition, however, is immaterial. The pH of the monomer mixture generally ranges from 4 to 6 at this stage in the reaction. To the above is then added the catalyst system to initiate the reaction. The polymerization is generally started at ambient temperatures.

During the reaction itself, heat is given off by virtue of the exothermic nature of the polymerization. Temperature rises of 50–100° F. have been noted. Generally, the bulk of the polymerization reaction occurs between 100 and 200° F. Agitation is usually employed during the mixing of monomer ingredients and polymerization step itself.

The reaction mixture then is composed of aqueous solutions containing about 5 to 80% by weight of monomers, 20% to 95% of water, and 0.001% to about 0.2% of catalyst based on the total weight of reaction mixture. Preferably 0.01 to 0.1% of catalyst is employed. While a redox system of catalyst is preferred, the invention may also include sole use of conventional peroxidic oxidizing agents such as potassium persulfate, hydrogen peroxide, and ammonium persulfate. Catalyst concentrations above 0.2% will polymerize the aqueous solution containing the monomers but the resultant polymer will generally be a gelled, unusable mass due to undesirable cross-linking, and/or it will have a relatively low molecular weight.

As noted above, in the preferred embodiment the reaction is initiated by a redox catalytic system additionally containing a metal ion. In a redox system, the catalyst is activated by means of a reducing agent which produces free radicals without the use of heat. One of these reducing agents most commonly used is sodium metabisulfite. Other reducing agents include water-soluble thiosulfates and bisulfites, hydrosulfites and reducing salts such as the sulfates of metals which are capable of existing in more than one valence state. These metals include cobalt, iron, nickel and copper. The use of a redox initiator system has several advantages, the most important of which is efficient polymerization at lower temperatures. The selection of catalyst and reducing agent, should a redox catalyst be used, and metal activators, for use in the process may be varied according to the choice of the experimenter. Conventional catalysts such as potassium persulfate, ammonium persulfate, etc., used in conjunction with the above reducing agents and activators such as ferrous ammonium sulfate work very satisfactorily. Use of other activating metal ions than ferrous ion such as cupric, ferric, stannic, etc., also improve the polymerization scheme. In the most preferred initiator system, ferrous ammonium sulfate, ammonium persulfate, and sodium metabisulfite are employed and when added to the monomer mixture give excellent polymerization products in a minimum of time. In particular, use of ferrous iron obviates the need of nitrogen sparging, which for other systems is normally required to give the most acceptable product. One preferred initiator system contains 50–100 p.p.m. of ferrous ion as ferrous ammonium sulfate, 100 p.p.m. sodium metabisulfite and 100 p.p.m. ammonium persulfate. When a redox catalyst system is employed in conjunction with a metal ion, the concentration of each may range from 0.001 to 0.2% and preferably from 0.01 to 0.1% based on the weight of the reaction mixture.

The following examples are illustrative of representative types of allylicamine-acrylamide copolymers and various techniques employed in producing same.

*Example I*

A monomer solution containing 125 grams of diallylamine was added to an open vessel equipped with an agitator. 125 grams of hydrochloric acid (approximately 37% concentration by weight) was added to the diallylamine solution in order to form the hydrochloride salt thereof. The pH of this solution was approximately 4.5. To the diallyl salt solution was then added 375 grams of acrylamide, also made up in aqueous solution. The respective monomers were thoroughly mixed and sufficient catalyst initiator system, composed of ferrous ammonium sulfate, sodium metabisulfite, and ammonium persulfate, as 1% solutions, were added to give 6, 1, and 1 grams of these reagents respectively. The three reagents were prepared as solutions just prior to their use, since decomposition occurs to some extent in all three solutions. The water content of the reaction mix was adjusted to give 20% monomer solution. The polymerization reaction proceeded exothermally starting at ambient temperature (70–95° F.). During the course of the reaction, the temperature rise was approximately 70° F. When the reaction appeared to be complete, that is, when heat ceased to be evolved due to the reaction, the copolymer was then diluted to a 5% solution of active copolymer comprising polyacrylamide and polydiallylamine hydrochloride salt. In this example, the ratio of starting monomer acrylamide to starting monomer diallylamine was 75:25.

*Example II*

In this example, the polymerization technique was changed as well as the ratio of monomers. Here monomer solutions were placed in 16-ounce jars, sparged with nitrogen before and during the addition of the redox catalyst (sodium metabisulfite and ammonium persulfate). The nitrogen was applied for a minimum of three minutes before beginning the redox addition. The jar was then tightly capped, placed in a thermostatically controlled water bath, and allowed to react to a maximum viscosity. Agitation was not generally employed, other than that necessarily obtained by removing the jar periodically from the bath and checking its viscosity by leisurely inverting the jar. The final product was a 10% solution of active copolymer prepared with a 65:35 ratio of acrylamide to diallylamine.

*Example III*

A 3-neck flask, equipped with stirring device, thermometer, nitrogen sparger and heating mantle, was set up into which monomer solutions of acrylamide and diallylamine salt were introduced and then thoroughly mixed. Then a vacuum was applied along with heat which was in turn followed by nitrogen sparging. This step was carried out in order to rid the system, both solution and atmosphere above the solution, from air containing oxygen. The catalyst, consisting of a redox system of sodium metabisulfite and ammonium persulfate, was added with continued nitrogen sparging, and the solution was then allowed to polymerize. Here a 500 gram batch of 10% solution of active chemical was prepared with an 85:15 ratio of acrylamide to diallylamine.

*Example IV*

25 pounds of diallylamine was added to 375 pounds of Chicago tap water and placed in a stainless steel reactor (Dopp Kettle). To this was added 25 pounds of a 37% concentration solution of hydrochloric acid producing the diallylamine salt. The pH of this solution at this time was 4.6. 75 pounds of acrylamide was then added to the salt solution and the temperature adjusted within the range of 70–95° F. The initiator system, consisting of 126.3 grams of ferrous ammonium sulfate, and 22.7 grams each of ammonium persulfate and sodium metabisulfite was added and the reaction allowed to proceed. 30 minutes after a peak temperature of 160° F. was reached, 1,500 pounds of Chicago tap water was added to give a final product containing 5% active copolymer.

*Example V*

150 pounds of diallylamine and 266 gallons of Chicago tap water along with 148 pounds of a 37% concentrated hydrochloric acid solution were added to a reaction tank. The pH of the mix was 4.4. 450 pounds of acrylamide was then added to the salt solution and the pH was thereby reduced to 4.05. Additional diallylamine was then added to bring the pH up to 4.5. The reaction mixture was then heated to 111° F. and the initiator system was added in the following order: 758 grams of ferrous ammonium sulfate (10% concentration), 136 grams of sodium metabisulfite (10%) and 136 grams of ammonium persulfite (10%). The reaction then set itself off and 12 minutes after the initiator system had been added a peak temperature of 175° F. was reached. Three minutes later 1079 gallons of tap water were added to the reaction mixture in order to give a 5% active copolymeric solution.

*Evaluation of the invention*

In order to determine the effectiveness of the copolymers of the invention, a procedure was devised whereby the clarity of the non-oily continuous phase, in this case, water, was measured subsequent to emulsion breaking treatment. This method, known as the "Phototester Method" involved a measurement of the light absorption of the aqueous liquid continuous phase remaining after resolution of the oil-in-water emulsion by the copolymeric cationic water-soluble copolymers. The percent light absorbed as measured then is inversely proportional to the clarity of the withdrawn aqueous phase. The lower the number as measured as percent absorption the greater the demulsification activity per unit time. Specifically, the procedure is as follows: 5 minutes after agitation of a 100 ml. sample of a treated emulsion in a graduated six-ounce prescription bottle, a sample of the aqueous bottom layer is pipetted out and placed in a cuvette. This sample is placed in the Phototester and the percent light absorbed is read. Care is particularly taken that none of the top oil layer remains on the pipette. The clarity of the water phase, used as a criteria for emulsion breaking activity is, of course, inversely proportional to the percent absorption of light as read.

A standard emulsion was especially prepared in each series of runs in order to evaluate the emulsion breaking activity of the copolymers of the invention. This emulsion was prepared by emulsifying mineral seal oil in water with a sodium oleate soap. 10% mineral seal oil and 89% water were emulsified with 1% of a 5% solution of soap by mixing the above ingredients in an "Osterizer" blender at high speed for 1 minute.

Table I below demonstrates that the acrylamide to cationic monomer ratio may be varied as well as the initiator system and temperature of reaction without materially affecting the activity of the formed copolymeric demulsifiers' activity. The copolymers in this study were prepared by copolymerizing acrylamide and diallylamine in 500 gram batches to give a final 10% by weight active product. The polymerization reaction was initiated with a sodium metabisulfite-ammonium persulfate catalyst system in the presence of nitrogen.

Table II below also shows results of demulsifying activities of acrylamide-diallylamine copolymers. In this case, ferrous ion as ferrous ammonium sulfate, was used in conjunction with ammonium persulfate and sodium metabisulfite and the samples were prepared as 20% active polymer concentrates in 100 gram batches. In each case the acrylamide:diallylamine ratio was held constant at 75:25. However, the initiator system was varied. Results show that the portions of various constituents of the initiator system may be varied over wide ranges without deleterious effects upon the activity of the copolymeric emulsion breakers.

TABLE II

| Initiator System (ml./100 cc. batch) | | | Percent Light Absorption | |
|---|---|---|---|---|
| 1% Fe | 1% $Na_2S_2O_5$ | 1% $(NH_2)_2S_2O_8$ | 200 p.p.m. | 300 p.p.m. |
| .01 | 2.0 | 2.0 | 89 | 8 |
| .05 | 2.0 | 2.0 | 82 | 17 |
| .10 | 2.0 | 2.0 | 45 | 12 |
| 1.4 | 1.5 | 1.5 | 24 | 7 |
| 3.5 | 1.5 | 1.5 | 13 | 7 |
| 3.5 | 1.0 | 1.0 | 21 | 10 |
| 0.5 | 1.5 | 1.5 | 29 | 7 |
| 1.0 | 1.5 | 1.5 | 76 | 11 |
| 2.0 | 1.5 | 1.5 | 80 | 11 |
| 0.5 | 1.0 | 1.0 | 5 | 16 |
| 1.0 | 1.0 | 1.0 | 8 | 8 |

The above tests show that the copolymers of the invention showed superior performance of emulsion breaking activity as determined by evaluation of light absorbed in water phase. The tests run above were particularly stringent in that only a five-minute settling time was allowed before the continuous aqueous phase was measured for its clarity. Settling time in the majority of field operations will vary from about two hours to two days with most operations for resolution of oil-in-water emulsions being carried out by overnight settling of 16–20 hours.

In addition to treatment of the laboratory prepared emulsions, the copolymers of the invention and particularly the acrylamide-diallylamine copolymer as prepared in Example V were tested for effectiveness in a variety of emulsions obtained from actual field operations. These included emulsions of petroleum refinery slop oils, and those resulting from metal working and chemical processing. In these cases, the dosage was varied from 200 p.p.m. to 8000 p.p.m. and gave results, when measured as percent light absorbed of the separated aqueous phase, varying from 50% improvement to 500% improvement of the blank or non-treated sample allowed to settle for a similar time. In all cases the pH was adjusted to 6.0, and it was noted that superior emulsion breaking results were obtained particularly when the pH is adjusted between the range of 2.0 to 7.0.

The composition of Example V was also tested as to its effectiveness in breaking an emulsion resulting from a metal working operation at various pH's. Table III below shows that this composition is particularly effective in pH ranges of 2.0–8.0 and more preferably 2.0–6.0.

TABLE I

| Acrylamide: Diallylamine Ratio | Temp., ° F. | | Initiator System (ml., 1% Solution) | | Viscosity (1% Solution, c.p.s.) | Percent Light Absorbed, 200 p.p.m., Copolymeric Additive |
|---|---|---|---|---|---|---|
| | Init. | Max. | Ammonium Persulfate | Sodium metabisulfite | | |
| 65:35 | 144 | 159 | 1.25 | 2.5 | 5.5 | 26 |
| 65:35 | 122 | 132 | 1.25 | 2.5 | 9.5 | 12 |
| 75:25 | 148 | 164 | 1.25 | 2.5 | 6.0 | 6 |
| 75:25 | 116 | 132 | 1.25 | 2.5 | 8.0 | 8 |
| 75:25 | 101 | 106 | 1.25 | 2.5 | 16.5 | 3 |
| 75:25 | 120 | 124 | 1.25 | 2.5 | 18.0 | 8 |
| 85:15 | 120 | 138 | 0.40 | 0.8 | 35.0 | 10 |

TABLE III

| | pH | | | | | | | | | | | | | |
|---|---|---|---|---|---|---|---|---|---|---|---|---|---|---|
| | 2.0 | | 3.0 | | 4.0 | | 5.0 | | 6.0 | | 7.0 | | 8.0 | |
| Settling time (hrs.) | 3 | 24 | 3 | 24 | 3 | 24 | 3 | 24 | 3 | 24 | 3 | 24 | 3 | 24 |
| Dosage, p.p.m.: | | | | | | | | | | | | | | |
| 0 | | | | | | | | | | | | | | |
| 200 | 96 | 83 | 100 | 92 | 100 | 96 | -------- | 96 | 100 | 98 | 100 | 100 | 100 | 100 |
| 1,000 | 44 | 6 | 58 | 8 | 99 | 14 | -------- | 8 | 95 | 12 | 100 | 97 | 100 | 82 |
| 1,500 | 38 | 4 | 37 | 8 | 44 | 6 | -------- | 7 | 46 | 12 | 91 | 80 | 98 | 83 |
|  | 40 | 13 | 37 | 6 | 42 | 6 | -------- | 7 | 45 | 10 | 91 | 81 | 96 | 84 |
| 2,000 | 43 | 6 | 34 | 6 | 43 | 7 | -------- | 6 | 38 | 10 | 90 | 80 | 94 | 80 |

It was noted that the cationic water-soluble acrylamide copolymers of the invention have surprisingly superior activity in resolving oil-in-water emulsions compared to the non-ionic or anionic acrylamide polymers such as the homopolymer of acrylamide or non-ionic or anionic copolymers thereof. Various acrylamide polymers of the above classes were prepared and tested for effectiveness according to the test procedure outlined above. Results are given in Table IV below.

TABLE IV

| Chemical | P.p.m. Treatment | Percent Light Absorbed | | | |
|---|---|---|---|---|---|
| | | 15 minutes standing | 1 hour standing | 3 hours standing | 24 hours standing |
| Diallylamine-acrylamide copolymer | | | | | |
| Acrylamide-dimethylaminoethyl methacrylate copolymer | 20 | 5 | -------- | 4 | 4 |
| Acrylic acid acrylamide copolymer | 20 | 76 | -------- | 34 | 8 |
| Do | 10 | 100 | -------- | 96 | 86 |
| Do | 20 | 100 | -------- | 94 | 89 |
| Do | 40 | 100 | -------- | 88 | 87 |
| Polyacrylamide | 60 | 100 | -------- | 82 | 82 |
| Do | 10 | 100 | -------- | 94 | 86 |
| Do | 20 | 100 | -------- | 94 | 88 |
| Do | 40 | 100 | -------- | 94 | 88 |
| Do | 60 | 100 | -------- | 94 | 89 |
| Do | 100 | 100 | -------- | 83 | 84 |
| Do | 300 | 100 | -------- | 80 | 78 |
| Do | 500 | 100 | -------- | 76 | 74 |
| Do | 700 | | | | |
| Diethylaminoethyl acrylate-acrylamide copolymer | 10 | -------- | 19 | -------- | 10 |
| Vinylpyridine-acrylamide copolymer | 10 | -------- | 64 | -------- | 19 |
| Blank | | 100 | -------- | 94 | 86 |

The copolymeric cationic water-soluble materials of the invention have a high level effectiveness when used to resolve oil in non-oily media emulsions of widely different compositions of any of the types previously discussed above, such as crude or refined petroleum in water or animal, vegetable oils or synthetic oily materials in water. Particular areas in which the demulsifiers have shown excellent results are in the metal working industry, as in aluminum and steel rolling mills. Here, oil-in-water emulsions are used to cool and lubricate the metal as it is being rolled. When the emulsion becomes spent, the oil must be recovered for subsequent use and the water discarded. Excellent resolution of the emulsion into its respective phases is necessary in order to obtain as pure an oil product as is feasible and also to overcome contamination of sewage which may result from dumping water containing minor amounts of oil to discharge areas. Another area where the emulsion breakers of the invention have shown preferred use is in refinery operations. Here, the refinery effluents are very frequently contaminated with oil which must be removed. Lastly, many oil-in-water emulsions result from chemical processing. For example, catalytically cracked propane which is primarily used to form ethylene gas and other polymeric by-products along with benzene or benzene derivatives is normally washed with water. The polymeric compounds and aromatic derivatives are usually removed from the gas in water spray towers and frequently form stable emulsions. These must be broken in order to reduce the water content of the oily material to the desired level.

Application of the cationic acrylamide demulsifiers of the invention and particularly the acrylamide-diallylamine copolymers may be suitably employed in demulsifing wax-hexane-water emulsions encountered in dewaxing operations and refineries, and in treating emulsions formed in cooling water systems such as in gasoline absorption plants, paper mills, etc., pipe press emulsions from steam actuated presses in clay pipe manufacture, emulsions formed from cleaning aircraft, emulsions formed in production of styrene-butadiene copolymers, emulsions existing in production of synthetic resins, etc. Resolution of emulsions whether naturally-occurring, synthetically produced or unavoidably produced through accident, fall within the scope of the present process.

In order to carry out the instant process and resolve an oil-in-water emulsion or emulsion of oil in non-oily media, it is only necessary to introduce the reagent at any convenient point in the system, and then mix it thoroughly with the emulsion. This may be done by mechanical agitation, for example, paddle mixing, gas agitation or pump circulation. The thus treated emulsion is then allowed to stand in a quiescent state until the constituent phases of the emulsion separate. The production of stratified layers will, of course, vary with the nature of the emulsions and the apparatus available. Generally, settling time or time necessary to obtain the desired resolution is interrelated with the amount of copolymeric feed and agitation. Thus, if the available settling time is relatively short, additional reagent may necessarily have to be added. Likewise, if extreme agitation is available, the dosage of chemical to give like results need not be as high.

Often when a suitable gas such as air is introduced into the emulsion to be resolved after the copolymer has been added, even a quicker, cleaner and more efficient resolution may be effected. Thus, by subjecting the chemicalized emulsion with a gas in a type of sub-aeration flotation cell, the constituent layers are obtained in a matter of minutes or even seconds without quiescent settling. However, subjecting the emulsion to a flotation type technique without chemical addition proves in most instances to give no effective demulsification.

The emulsion breakers of the invention may also be used in combination with many ionic species known to give some resolution, such as metallic salts including aluminum, calcium, magnesium, etc.

Throughout the foregoing description of the invention, the term "oil in water" emulsions have been used. By the term "oil" is meant a non-aqueous hydrophobic oily liquid which is not substantially soluble or miscible in water. By "water" is meant water itself or aqueous solutions containing varying amounts of water or hydrophilic, non-oily liquids (such as polar alcohols, ketones, and the like), which are not readily soluble or miscible in oils.

It is apparent that many modifications and variations of the invention may be practiced other than those specifically enumerated without departing from the true scope of the invention.

The invention is hereby claimed as follows:

1. A method of breaking emulsions of the type comprising an oil phase dispersed in a non-oily continuous phase which comprises the steps of treating the emulsion with at least a demulsifying amount of a cationic copolymer having a molecular weight of at least 2000 and obtained by copolymerization of acrylamide and a bis-ethylenically unsaturated compound represented by the following structural formula:

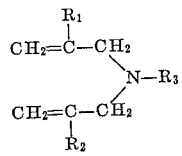

where $R_1$ and $R_2$ each represent a member of the class consisting of hydrogen and methyl, and $R_3$ is selected from the group consisting of hydrogen and lower alkyl radicals, and separating said phases.

2. The method of claim 1 wherein the pH of said emulsion is adjusted below about 8.0 prior to treatment with said demulsifier.

3. The method of claim 1 wherein said demulsifier is added to said emulsion in a dosage of at least 10 p.p.m.

4. A method of breaking emulsions of the type comprising an oil phase dispersed in a non-oily continuous phase which comprises the steps of treating the emulsion with at least a demulsifying amount of a water-soluble cationic copolymer having a molecular weight of at least 2000 and obtained by copolymerization of acrylamide and diallylamine, and separating said phase.

5. The method of claim 4 wherein said demulsifier is added to said emulsion in a dosage of at least 10 p.p.m.

6. The method of claim 4 wherein the pH of said emulsion is adjusted below 8.0 prior to treatment with said demulsifier.

7. The method of claim 4 wherein said copolymer comprises 1–99 parts of acrylamide and 1–99 parts of diallylamine.

8. The method of claim 4 wherein said emulsion treated is a petroleum oil-in-water emulsion.

9. A method of breaking emulsions of the type comprising an oil-phase dispersed in a non-oily continuous phase which comprises the step of treating the emulsion with at least a demulsifying amount of a copolymeric polyacrylamide demulsifier having a molecular weight of at least 2000 and derived by copolymerizing acrylamide and a cationic comonomer selected from the group consisting of diallylamine, diethylaminoethyl methacrylate, vinyl pyridine, and diethylaminoethyl acrylate and separating said phases.

References Cited by the Examiner

UNITED STATES PATENTS

| | | | |
|---|---|---|---|
| 2,915,476 | 12/1959 | Shen | 253—341 |
| 2,995,512 | 8/1961 | Weidner et al. | 252—344 |
| 3,032,539 | 5/1962 | Schuller et al. | 260—80.3 |
| 3,090,759 | 5/1963 | Jenkins | 252—344 |
| 3,198,745 | 8/1965 | Monson et al. | 252—344 |
| 3,200,106 | 8/1965 | Dickson et al. | 252—344 |

LEON D. ROSDOL, *Primary Examiner.*

H. B. GUYNN, *Assistant Examiner.*